United States Patent [19]
Liinamaa et al.

[11] Patent Number: 5,898,921
[45] Date of Patent: Apr. 27, 1999

[54] MONITORING OF THE OPERATION OF A SUBSCRIBER UNIT

[75] Inventors: Olli Liinamaa; Jussi Sarpola, both of Oulu; Pekka Rusi, Isokyre; Arto Tiihonen, Oulu, all of Finland

[73] Assignee: Nokia Telecommunications Oy, Espoo, Finland

[21] Appl. No.: 08/669,486

[22] PCT Filed: Jan. 13, 1995

[86] PCT No.: PCT/FI95/00011

§ 371 Date: Jul. 11, 1996

§ 102(e) Date: Jul. 11, 1996

[87] PCT Pub. No.: WO95/19686

PCT Pub. Date: Jul. 20, 1995

[30] Foreign Application Priority Data

Jan. 14, 1994 [FI] Finland .................................. 940195

[51] Int. Cl.$^6$ .................................................. H04B 17/00
[52] U.S. Cl. ........................... 455/423; 455/424; 455/425
[58] Field of Search ................................... 455/423, 424, 455/425

[56] References Cited

U.S. PATENT DOCUMENTS

| 4,415,770 | 11/1985 | Kai et al. | 455/424 |
| 4,554,410 | 11/1985 | Furumoto | 455/425 |
| 4,622,438 | 11/1986 | Shimizu et al. | 455/423 |
| 5,027,427 | 6/1991 | Shimizu | 455/425 |
| 5,134,643 | 7/1992 | Iwata | 455/423 |
| 5,404,573 | 4/1995 | Yabe et al. | 455/423 |
| 5,542,120 | 7/1996 | Smith et al. | 455/425 |
| 5,684,869 | 11/1997 | Nicholas | 455/423 |

FOREIGN PATENT DOCUMENTS

| 344 624 | 12/1989 | European Pat. Off. | H04Q 7/04 |
| 2 087 690 | 5/1982 | United Kingdom | H04Q 7/00 |

*Primary Examiner*—David R. Hudspeth
*Assistant Examiner*—Daniel Abebe
*Attorney, Agent, or Firm*—Pillsbury Madison & Surtro LLP

[57] ABSTRACT

In a method of monitoring the operation of a subscriber unit in a telecommunication system, in order to detect possible malfunctions as early as possible, a call reserved in signaling for some other purpose is transmitted to the subscriber unit, whereupon a call to which the subscriber unit automatically responds is selected as the call. A message about receiving the call is awaited from the subscriber unit, and, if not such message is received from the subscriber unit, the call is repeated until the subscriber unit has left a predetermined number of transmitted calls unanswered, whereupon an alarm is given.

7 Claims, 1 Drawing Sheet

MONITORING OF THE OPERATION OF A SUBSCRIBER UNIT

BACKGROUND OF THE INVENTION

The invention relates to a method of monitoring the operation of a subscriber unit of a telecommunication system. The invention also relates to a subscriber network element of a radio system providing a wireless local loop, the subscriber network element having a data transmission connection with a telephone exchange and comprising means for establishing, via base stations, a radio connection to the subscriber units located in the coverage area of the radio system, for transmitting telecommunication signals between the subscriber units and the exchange.

The invention relates in particular to monitoring the operation of a subscriber unit to be used in a WLL system, i.e. a radio system providing a wireless local loop. In a WLL system, an ordinary two-wire telephone set is connected via a radio connection by means of a special terminal equipment to the local exchange, which in turn is connected to the public telephone network via network cabling. In this connection, a subscriber unit refers to the equipment the subscriber has for transmitting and receiving telecommunication signals, i.e. in case of the WLL system, the subscriber unit comprises a WLL terminal equipment consisting of a radio part and a teleadapter (to which the user interface, e.g. a telephone, is connected), and a user interface, such as a telephone, a telefax terminal, a computer/modem combination or the like, connected to the terminal equipment.

To guarantee the interference-free transfer of telecommunication signals, for example phone calls, it is necessary to monitor subscriber units so that possible malfunctions will be detected as early as possible. It is especially important to monitor WLL subscriber units, since they are more prone to malfunctions than normal subscriber units operating via a cable.

SUMMARY OF THE INVENTION

The purpose of the invention is to provide a method of monitoring the operation of subscriber units so that possible malfunctions will be detected as early as possible, even before the user of the subscriber unit notices that a malfunction has occurred. These aims are achieved with the method according to the invention, which is characterized in that a call reserved in signalling for some other purpose is transmitted to the subscriber unit, a call to which the subscriber unit automatically responds being selected as the call, a message is awaited from the subscriber unit about receiving the call, and if the message is not received from the subscriber unit, the call is repeated until the subscriber unit has left a predetermined number of transmitted calls unanswered, whereupon an alarm is given.

The invention is based on the idea that malfunctions in a subscriber unit can be detected very early, when the operation of the subscriber unit is systematically tested during light traffic by transmitting a call to the subscriber unit and by receiving a message from the subscriber unit about receiving the call, when the subscriber unit is out of use, i.e. when the user of the unit is not using his or her unit. Since a call which already exists for some other purpose and to which the subscriber unit automatically responds is chosen as the test call, there is no need to define for the subscriber unit a special call for the test. If the subscriber unit responds to the transmitted call, it is considered to be in order. Otherwise the call is repeated at certain intervals as many times as the operator has determined, after which the subscriber unit is considered to be faulty, unless it has by then transmitted a message about receiving the call. The most important advantage of the method according to the invention is that the operation of the subscriber unit can be monitored continuously, i.e. also when the unit is not used for a long time, without having to define a special test call for the subscriber unit for this purpose. The method according to the invention can thus be applied to all existing units without having to specifically design a subscriber unit to make the testing possible.

In one preferred embodiment of the method according to the invention, the connection to the subscriber unit is released as soon as a message has been received from the subscriber unit about receiving the call, i.e. before the subscriber unit forwards the call to the user of the unit. Thus the operation of the subscriber unit can be monitored completely automatically without the user of the unit having to participate in any way in the monitoring or even having to know about the test.

The invention also relates to a subscriber network element by means of which the method of the invention can be applied. The subscriber network element according to the invention is characterized in that the subscriber network element comprises testing means for monitoring the operation of the subscriber unit, the testing means comprising a transmitting unit for transmitting a call reserved in signalling for some other purpose to the subscriber unit, the call being of the type to which the subscriber unit automatically responds, a receiving unit for receiving a message transmitted by the subscriber unit as a response to the call, and a control unit, which causes the transmitting unit to transmit the call again until the receiving unit has received the message, or until the call has been transmitted a predetermined number of times, whereupon the control unit gives an alarm.

BRIEF DESCRIPTION OF THE DRAWING

In the following, the invention will be described in greater detail by means of its first preferred embodiment with reference to the accompanying which

DETAILED DESCRIPTION

Figure 1:
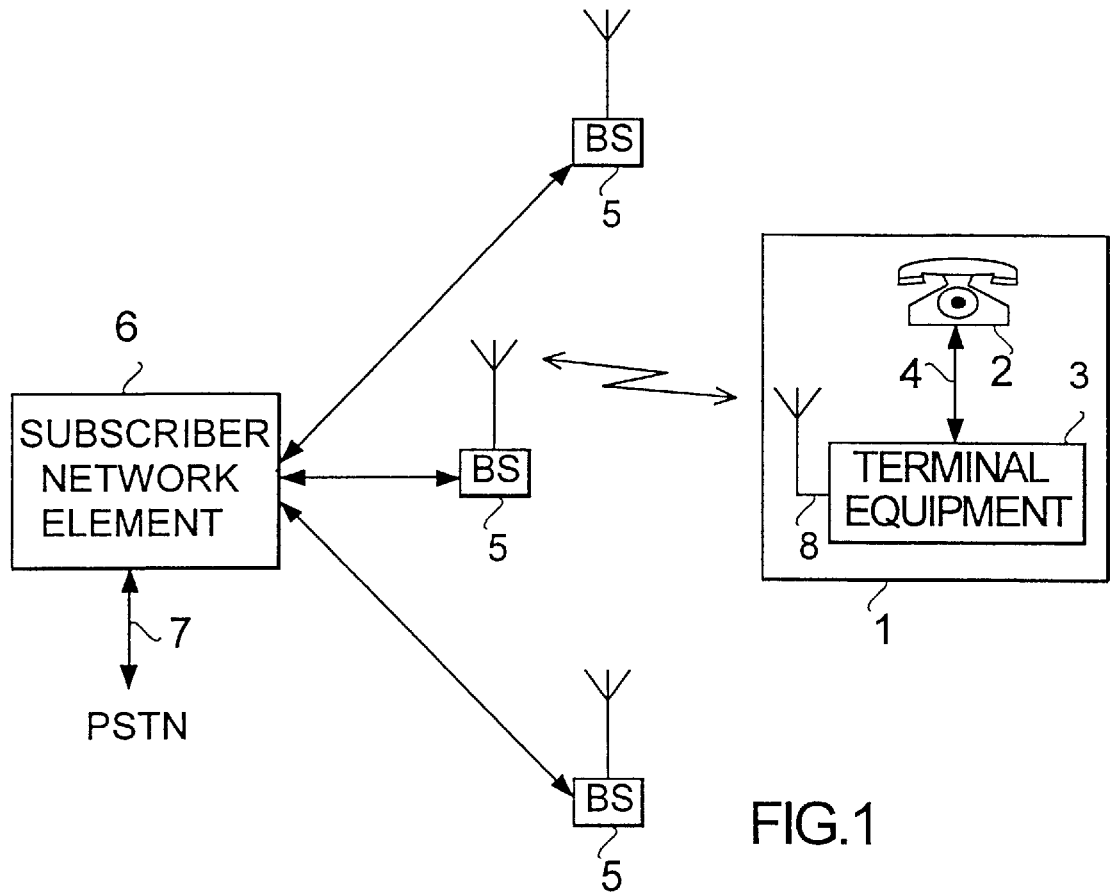
FIG. 1 is a block diagram of a part of a WLL system.

FIG. 1 is a block diagram of a part of a WLL system where the method according to the invention can be applied. The subscriber unit 1 shown in the figure comprises a user interface, i.e. a telephone 2, and a terminal equipment 3. The phone in FIG. 1 is an ordinary phone connected to the exchange by means of a two-wire line. Instead of the phone 2, the system shown in the figure could equally well employ some other ordinary user interface, such as a telefax terminal or a computer/modem combination, connected to the exchange by means of a two-wire lead.

The phone 2 and the terminal equipment 3 are connected in FIG. 1 by a two-wire lead 4, through which telecommunication signals can be transmitted between the terminal equipment and the phone. The terminal equipment 3 comprises signal processing means for adapting a speech path to a radio channel. Such signal processing means are for example a radio part consisting of an antenna 8, a radio transmitter and a radio receiver, and a teleadapter which adapts the radio part to an ordinary telephone set 2.

The subscriber unit 1 is connected via the antenna 8 to a base station 5 (FIG. 1 shows three base stations BS) through which the calls are transmitted, via a subscriber network element 6, to the PSTN (Public Switched Telephone Network), i.e. the fixed telephone network 7. The subscriber network element 6 thus comprises a base station controller for controlling the base stations 5, and means for maintaining the telecommunication connection to the fixed phone network.

The base stations 5 correspond to the base stations of an NMT-450i cellular radio system (Nordisk Mobil Telefon). Thus, as far as the signal transmission is concerned, the subscriber unit 1 functions like a normal hand-held mobile phone of the NMT-450i system. Through the base stations 5 and the subscriber network element 6, calls can also be made with an ordinary mobile phone of the NMT-450i system, provided that the network operator has programmed the subscriber network element with a view to connecting calls for such a phone. In such a case, the aforementioned NMT phone can only be used, however, in the coverage area of one base station 5, since the network element shown in the figure does not include handover means with which an on-going call could be transferred between the base stations.

Figure 2:
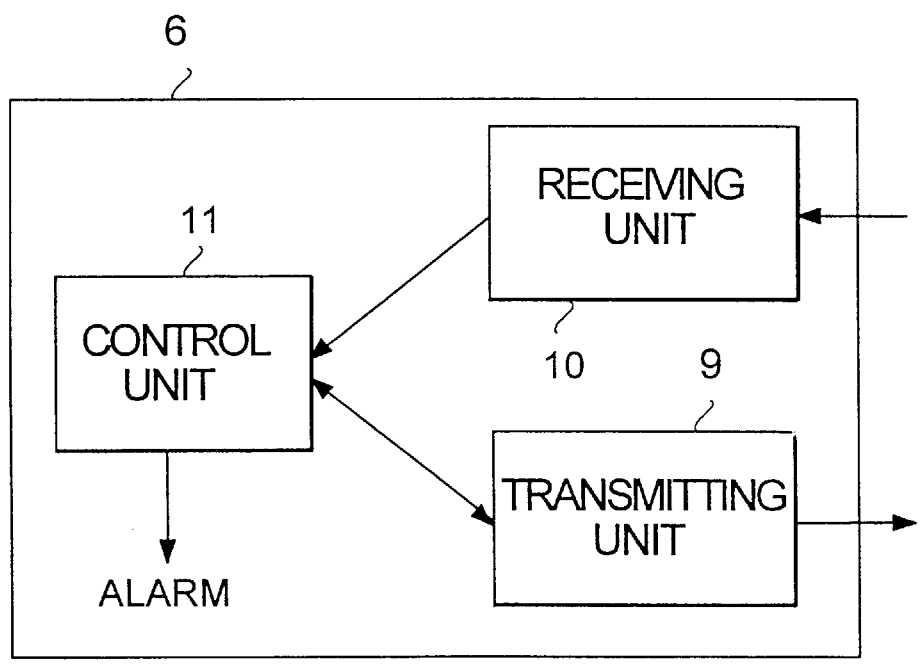
FIG. 2 is a partial block diagram of the subscriber network element shown in FIG. 1.

FIG. 2 represents a partial block diagram of the subscriber network element of FIG. 1. FIG. 2 shows only the testing means which are needed for monitoring the operation of subscriber units during light traffic. The aforementioned testing is preferably carried out at least partially by means of a computer program. At a time of the day determined by the network operator, a transmitting unit 9 included in the testing means transmits a test call alternately to each of the subscriber units in the subscriber unit register of the subscriber network element. The test call to be transmitted is the same as the message for an ending call used in the NMT-450i system. When the terminal equipment of the subscriber unit detects the call, it responds to it by transmitting a predetermined message to the subscriber network element 6. A receiving unit 10 in the subscriber network element detects the aforementioned message and forwards it to a control unit 11. Since in the exemplary case the test call is the same as the message for an ending call, the terminal equipment 3 of the subscriber unit 1 does not forward the received message to the phone 2. The user of the subscriber unit does not thus detect the test at all.

If the subscriber unit 1 does not respond to the call, i.e. the control unit 11 does not receive a message from the subscriber unit through the receiving unit 10, the control unit 11 marks down that particular subscriber unit to a special list of subscriber units to be monitored and causes the transmitting unit 9 to repeat the call again after a certain delay. If the subscriber unit 1 still does not respond to the call, the control unit 11 causes the transmitting unit 9 to repeat the call a third time (the number of the repeated calls is determined by the network operator), before it considers the subscriber unit to be faulty and gives an alarm by transmitting a message to the network operator or by marking down the code of the faulty unit to a special register.

If the subscriber unit to be tested is engaged when the test begins, the subscriber network element 6 immediately discontinues the test without sending a test call and interprets that the subscriber unit is in order.

It must be understood that even if the invention is described above, by way of example, only in connection with the WLL system, the method according to the invention can also be applied in the subscriber units of other systems. Thus, the method according to the invention can equally well be used to monitor the operation of subscriber units of, for example, a cellular radio system or a fixed, i.e. wired, telecommunication system. The preferred embodiments of the method and the subscriber network element according to the invention may thus vary within the scope of the appended claims.

We claim:

1. A method of monitoring the operation of a subscriber unit of a telecommunication system having provisions which reserve in signaling a given call for a purpose other than monitoring operation of a subscriber unit, and to which the subscriber unit, upon receiving the given call, automatically, said method comprising the steps of:

transmitting the given call to the subscriber unit;

awaiting receipt of a message from the subscriber unit about receiving the given call; and if the message is not received from the subscriber unit, repeating transmitting of the given call until the subscriber unit has left a predetermined number of transmitted instances of the given call unresponded to, and thereupon giving an alarm, wherein a message for an ending call is used as the given call.

2. The method according to claim 1, further comprising:

if a message is received from the subscriber unit about receiving the given call, releasing a respective connection such as to prevent the subscriber unit from forwarding the given call it has received, to a user of the subscriber unit.

3. The method according to claim 2, wherein:

said transmitting is accomplished by transmitting the given call by radio-frequency signals to the subscriber unit, and said responding is accomplished by the subscriber unit transmitting radio-frequency signals.

4. The method according to claim 3, wherein:

the subscriber unit is a subscriber unit of a radio system providing a wireless local loop.

5. The method according to claim 1 or 2, wherein:

said transmitting is accomplished by transmitting the given call during light traffic on a normal calling channel of the subscriber unit.

6. A subscriber network element of a radio system providing a wireless local loop, said subscriber network element having a data transmission connection with a telephone exchange, said subscriber network comprising:

means for establishing, via a base system, a radio connection to a subscriber unit located in a coverage area of the radio system, for transmitting telecommunication signals between the subscriber unit and the exchange; and testing means for monitoring operation of the subscriber unit, said testing means comprising:

a transmitting unit for transmitting a given call which already is reserved in signaling in the base system for some other purpose, to the subscriber unit, the given call being of a type to which the subscriber unit upon receiving the given call automatically responds by sending a given message, a receiving unit for receiving the given message, if transmitted by the subscriber unit, as a response to the given call, and a control unit which causes the transmitting unit to transmit the given call again, if no given message is received, until the receiving unit has received the message and sent a given message, or until the given call has been transmitted a predetermined number of times by the transmitting unit, whereupon the control unit gives an alarm, wherein the transmitting unit is arranged to use a message for an ending phone call as the given call.

7. The subscriber network element according to claim 6, further comprising:

a timing device and a subscriber unit register listing the subscriber unit;

the testing means being arranged to test the subscriber listed in the subscriber register, at a time indicated by the timing device.

* * * * *